Jan. 24, 1956 H. BUERGER 2,732,262
ORNAMENTAL WHEEL ASSEMBLY
Filed Sept. 15, 1953
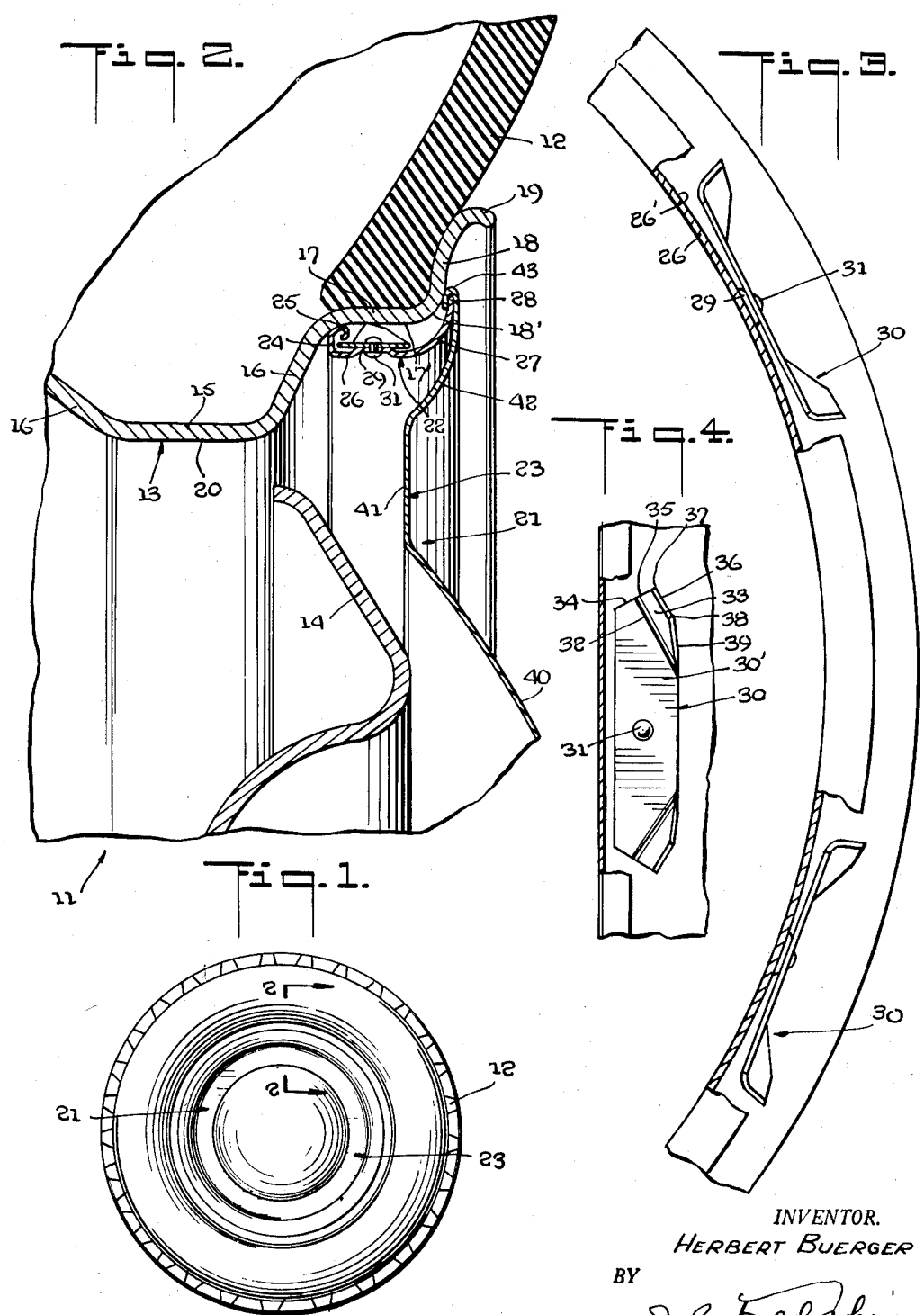
INVENTOR.
HERBERT BUERGER
BY
J. B. Felshin
ATTORNEY United States Patent Office 2,732,262
Patented Jan. 24, 1956

2,732,262

ORNAMENTAL WHEEL ASSEMBLY

Herbert Buerger, Walton, N. Y.

Application September 15, 1953, Serial No. 380,190

3 Claims. (Cl. 301—37)

This invention relates to an ornamental assembly of the type adapted to be fastened to the outer face of a vehicle to impart an attractive appearance thereto.

A primary object of the present invention is to provide a highly improved assembly of the character described, comprising a circular mounting ring adapted to be mounted to the vehicle wheel and a cover plate secured to the mounting ring and providing a decorative cover over the outer face of the wheel.

Another important object of the invention is to provide a novel means for attaching the mounting ring to the wheel, said means comprising a plurality of resilient fingers or detents secured to the exterior surface of the mounting ring and adapted to engage frictionally the adjacent surface of the wheel.

A further object of the present invention is to provide said resilient detents with a novel configuration whereby the detents may slide easily against the wheel surface as the ornamental wheel assembly is mounted on the wheel and whereby the detents frictionally grip or bite into said wheel surface if the assembly tends to move off the wheel, thereby maintaining the assembly in proper secured position on the wheel notwithstanding the severe vibration and shock to which the wheel is normally subjected in use.

Another object of the invention is to provide a novel arrangement for securing the detents to the mounting ring, the latter being provided with raised bosses to which the detents are secured at their central portions, thereby raising the opposite ends of the detents up out of contact with the adjacent surfaces of the mounting ring. The free unrestrained ends of the detents increases their resiliency and effectiveness since the detents are restrained only at their central portions where they are secured to the raised bosses of the mounting ring.

Another object of this invention is to provide a strong, rugged and durable construction of the character described, and which shall be economical to manufacture, easily attached to the wheel, and which shall be decorative and attractive in appearance.

Other objects and advantages of the present invention will become apparent as the description proceeds or are inherent in the structure described in this specification and illustrated in the drawing in which:

Fig. 1 is a side elevational view of the outer face of a vehicle wheel and tire thereon and with an ornamental assembly embodying the present invention mounted on the outer face of the wheel;

Fig. 2 is a cross sectional view taken on the line 2—2 of Fig. 1;

Fig. 3 is an enlarged view of a segment of the circular mounting ring as seen from the inner side thereof or to the right as viewed in Fig. 2, and with portions of the ring broken away and in section to show more clearly the details of the detents and their manner of attachment to the mounting ring; and Fig. 4 is an enlarged view of a segment of the ring and shows a detent in plan as would be seen looking radially inward from beyond the outer surface of the ring.

Referring to the drawing in more detail, the reference numeral 11 indicates generally a vehicle wheel having mounted thereon a tire 12. The wheel 11 may be of conventional construction and for purposes of illustration is shown in the drawing as being of the usual drop center type having an outer circular rim 13 surrounding a body portion 14.

As seen in Fig. 2, the rim portion 13 of wheel 11 comprises a horizontal base web 15 having integral therewith at its opposite edges a pair of angularly extending side walls 16. An outwardly projecting flange 17 is formed integral with each of the side walls 16 and has at its outer portion an upstanding rim edge 18 having an outwardly extending flange 19. The cross-section of the rim 13 thus described is uniform throughout the circular extent of the rim 13.

The body portion 14 of the wheel 11 is secured at its outer periphery to the inner surface 20 of the base web 15 in the usual manner. It is to be understood that the details of construction of wheel 11 form no part of the present invention and are disclosed merely to show the manner of mounting the ornamental assembly thereto.

A preferred embodiment of the ornamental assembly of the present invention is indicated generally by the reference numeral 21 and comprises a circular mounting ring 22 adapted to be assembled on the rim 13 and supporting a decorative cover plate 23.

For purposes of clarity and definiteness in describing the details of construction of the ornamental assembly 21, the terms "radially outward" and "radially inward" will be employed to indicate up and down directions, respectively, as viewed in Fig. 2, and the terms "axially outward" and "axially inward" will refer to right and left directions in the same figure, the axis used as a reference line being that of the wheel 11 which, of course, is coincident with the axes of the wheel axle (not shown) and the mounting ring 22. The same nomenclature, or equivalent terms, will be employed in the claims and the latter are to be interpreted in view of the above definitions.

Referring again to Fig. 2, the mounting 22 is formed of a continuous integral strip of metal having in cross-section a bent configuration including along its axially inner edge a radially outwardly extending flange 24. The radially outer edge of flange 24 is curled axially outward, then radially inward, and then axially inward, so as to form a continuous curled bead 25.

The flange 24 is formed integral with the main web portion 26 of the mounting ring 22. The web portion 26 is provided at its axially outward edge with an integral arcuate flange 27 which curves axially outward and then radially outward at its extreme outer edge 28.

The web portion 26 of mounting ring 22 is provided with a plurality of raised bosses 29 formed integral therewith and projecting radially outwardly from the outer surface 26' of web portion 26. It is preferred, although not necessary, that there be approximately eight of these bosses 29 at equidistant spaced intervals about the periphery of the mounting ring 22.

Mounted on each of the bosses 29 is a detent member indicated generally at 30, and best seen in Figs. 3 and 4. Each detent 30 is formed of an integral longitudinal strip of metal and is provided with a rivet hole intermediate its ends to receive the shank of a rivet 31 which also extends through a coaxial rivet hole formed in the boss 29, thereby rigidly securing the central portion of each detent member 30 to the outer surface of the respective boss 29.

The opposite halves of the detent member 30 extend oppositely from the riveted central portion in a direction substantially tangential to the circle formed by the mounting ring 22. Each of these opposite halves of detent member 30 may be termed a resilient detent or finger 30'. The outer end of each detent 30' is bent radially outwardly along the line 32 so as to form an upstanding projection or tooth 33. It should be noted that the lines 32 extend at an acute angle with respect to the longitudinal axis of the detent member 30 and converge with respect to each other toward the axially outward direction, that is, toward the right as viewed in Figs. 2 and 4, and into the plane of the paper as viewed in Fig. 3. This angular orientation of the lines 32 is of critical importance to the operation of the invention, as will be explained in more detail below.

The outer ends of the detents 30' are preferably formed with straight edges 34 cut perpendicularly to lines 32 so as to facilitate the bending of the detents 31 along lines 32. After the bending operation part of each edge 34 forms an inclined outer edge 35 of the respective tooth 33. Another edge 36 of tooth 33 intersects the inclined outer edge 35 at a sharp point or intersection 37 and extends therefrom in an inclined direction which is both axially outward and radially inward. At the intersection 38 the edge 36 meets an inclined edge 39 which extends in approximately the same direction as the edge 36 but at a steeper angle, as will be most easily understood from Fig. 4. The edge 39 meets with the flat planar portion of detent 30' at the adjacent end of line 32.

It will be noted that by mounting the detent member 30 on the raised boss 29 rather than directly upon the outer surface 26' of web portion 26, the oppositely extending halves or detents 30' are spaced above and out of contact with said outer surface 26'. By being thus freely projected in space and secured only by the rivet 31, the detents 30' are free to flex resiliently without interference due to friction or contact with the web portion 26, this free resiliency being highly advantageous as will be explained below.

The ornamental cover plate 23 may be of any desired configuration suitable for the particular vehicle for which the assembly 21 is intended, the embodiment shown in the drawing having a spherical central portion 40 formed integral with a flat portion 41 which in turn extends to a curved outer section 42. The outer peripheral edge of the section 42 is provided with a bent flange 43 curled around the outer edge 28 of the mounting ring 22, thereby maintaining the cover plate 23 in fixed assembled relation to said ring 22.

The mode of operation of the ornamental assembly 21 as it is applied to the vehicle wheel 11 will now be briefly described. The assembly 21 is first placed adjacent the wheel 11 with the cover plate 21 facing outwardly with respect to the vehicle. As the assembly 11 is moved axially inward toward the final assembled position shown in Fig. 2, the points 37 on the teeth 33 of detents 30' will first contact the rounded edge 18' at the intersection of wheel flange 17 with the upstanding rim edge 18. As the assembly 21 continues to move inward, the rounded edge 18' will act as a cam to urge the detents 30' in a radially inward direction.

This camming action of the rounded edge 18' causes a novel flexure in the resilient detents 30'. The latter will of course bend as a cantilever beam having a fixed end at the rivet 31 and a concentrated load applied at the point 37 of the tooth 33. In addition to this obvious bending action, the tooth 33 will also bend with respect to the flat planar portion of detent 30' about the line 32.

This secondary flexure is aided by angular orientation of the bend line 32. That is, the surfaces 17', 18' of wheel 11 frictionally engage the tooth point 37 and tend to urge the latter in an axially outward direction with respect to the assembly 21. The force thus imparted to the tooth point 37 has a vector component tending to bend the tooth 33 about line 32 in a direction to reduce the frictional engagement of the tooth point 37 with the wheel surfaces 17', 18'. This bending action considerably reduces the force necessary to slide the tooth points 37 with respect to the radially inward surface 17' of the wheel flange 17, thereby making it relatively easy to urge the assembly 21 axially inward until flange 43 abuts against the upstanding rim edge 18 in the final assembled position shown in Fig. 2.

It should be noted that accidental removal of the assembly 21 from the wheel 11 as a result of vibration and shock is highly improbable, particularly due to the novel construction of the detents 30' including the angular orientation of the bend lines 32. This is due to the fact that as the assembly 21 tends to move axially outward with respect to the wheel 11, the wheel flange surface 17' frictionally engages the tooth point 37 so as to impart thereto a force having a component tending to bend the tooth 33 about the bend line 32 in a direction so as to increase the frictional biting grip of the tooth point 37 on the wheel flange surface 17'.

In other words, when the assembly 21 is being applied to the wheel 11, the teeth 33 slide with comparatively little friction against the flange surface 17', but if vibration or shock tends to urge the assembly 21 in a direction off the wheel 11, the teeth 33 of detents 30' will bite harder into the flange surface 17' so as to maintain the assembly 21 in secure assembled position.

It is to be understood that the specific embodiment of the invention shown in the drawing and described in this specification is merely illustrative of one of the many forms which the invention may take in practice, the scope of the invention being delineated in the appended claims.

Having thus described my invention in some detail, what I claim and desire to secure by Letters Patent of the United States is:

1. An ornamental assembly adapted to be mounted on a vehicle wheel, said assembly comprising an annular mounting ring, an ornamental cover plate secured to said mounting ring, and a plurality of resilient detent members each extending longitudinally in a direction substantially tangential to the mounting ring and being secured to the exterior surface thereof at a central portion of said detent member, the ends of the latter projecting oppositely and being spaced radially outwardly of said exterior surface of the mounting ring, said detent members each having at the opposite projecting ends thereof an integral bent portion forming a tooth extending in a direction approximately radially outwardly, said integral portions being bent along lines at an acute angle with respect to the longitudinal axis of the detent member, the two bending lines at the opposite projecting ends of each detent member converging in an axially outward direction.

2. An ornamental assembly adapted to be mounted on a vehicle wheel, said assembly comprising an annular mounting ring, an ornamental cover plate secured to said mounting ring, said mounting ring being a plurality of raised bosses projecting radially outward therefrom, and a plurality of resilient detent members each extending longitudinally in a direction substantially tangential to the mounting ring and being secured to a respective one of said bosses at a central portion of said detent member, the ends of the latter projecting oppositely and being spaced radially outwardly of the adjacent surface of the mounting ring, said detent members each having at the opposite projecting ends thereof an integral bent portion forming a tooth extending in a direction approximately radially outwardly, said integral portions being bent along lines at an acute angle with respect to the longitudinal axis of the detent member, the two bending lines at the opposite projecting ends of each detent member converging in an axially outward direction.

3. An ornamental assembly adapted to be mounted on a vehicle wheel, said assembly comprising an annular mounting ring having an integral flange extending therearound in a radially outward direction, an ornamental cover plate having an integral curled flange around the periphery thereof and bent around said mounting ring flange so as to secure the cover plate thereto, said mounting ring having a plurality of raised bosses projecting radially outward therefrom, and a plurality of resilient detent members each extending longitudinally in a direction substantially tangential to the mounting ring and being secured to a respective one of said bosses at a central portion of said detent member, the ends of the latter projecting oppositely and being spaced radially outwardly of the adjacent surface of the mounting ring, said detent members each having at the opposite projecting ends thereof an integral bent portion forming a tooth extending in a direction approximately radially outwardly, said integral portions being bent along lines at an acute angle with respect to the longitudinal axis of the detent member, the two bending lines at the opposite projecting ends of each detent member converging in an axially outward direction.

References Cited in the file of this patent

UNITED STATES PATENTS

| | | |
|---|---|---|
| 1,889,070 | Hyatt | Nov. 29, 1932 |
| 1,945,348 | Farr | Jan. 30, 1934 |
| 1,953,634 | Reichenbach | Apr. 3, 1934 |

FOREIGN PATENTS

| | | |
|---|---|---|
| 782,207 | France | Mar. 11, 1935 |